United States Patent [19]

Leroux

[11] 4,418,775
[45] Dec. 6, 1983

[54] ENDLESS TRACK DRIVE DEVICE

[75] Inventor: Jean E. Leroux, Le Plessis Belleville, France

[73] Assignee: Poclain, Le Plessis Belleville, France

[21] Appl. No.: 168,252

[22] Filed: Jul. 10, 1980

[30] Foreign Application Priority Data

Jul. 24, 1979 [FR] France ................................ 79 19064

[51] Int. Cl.³ ............................................ B62D 55/12
[52] U.S. Cl. .................................. 180/9.62; 188/18 A
[58] Field of Search ...................... 180/9.62, 9.64, 9.5, 180/9.2 R, 6.5, 308, 65 F; 188/59, 18 A

[56] References Cited

U.S. PATENT DOCUMENTS

| 674,737 | 5/1901 | Lombard | 180/9.62 |
| 1,363,756 | 12/1920 | Ruppert | 180/6.7 |
| 1,853,308 | 4/1932 | Humpherys et al. | 305/13 |
| 3,168,929 | 2/1965 | Wardle | 180/9.54 |
| 3,486,574 | 12/1969 | Baron | 180/9.62 |
| 3,580,345 | 5/1971 | Brown et al. | 180/9.2 |
| 3,785,449 | 1/1974 | Ries | 180/6.48 |
| 3,872,939 | 3/1975 | Eckert | 180/6.48 |

FOREIGN PATENT DOCUMENTS 52-7535 1/1977 Japan ................................ 180/9.2 R Primary Examiner—John A. Pekar
Attorney, Agent, or Firm—Mason, Fenwick & Lawrence

[57] ABSTRACT

The invention relates to a device used for driving the endless track of an earthworking machine or implement comprising a main drive sprocket provided with a plurality of teeth, which cooperate with a pinion whose outer teeth have a shape corresponding to that of the driving fingers of the endless, the said main drive sprocket being, on the one hand, mounted for rotation on a support secured to the chassis of the machine, and on the other hand, coupled to an hydraulic motor which drives it in rotation and is mounted on the said support, via the said pinion, which is wedged on the output shaft of the said hydraulic motor. The support which is common to the main drive sprocket, to its driving pinion and to the hydraulic motor has a vertical plane of symmetry which merges with the plane of symmetry common to the main drive sprocket and to its driving pinion. The invention finds an application in hydraulic shovels with caterpillar tracks.

2 Claims, 3 Drawing Figures

ENDLESS TRACK DRIVE DEVICE

BACKGROUND AND OBJECTS OF THE INVENTION

The present invention relates to the design of the device used for driving a deformable endless link, such as the endless track of a hydraulic shovel.

According to a known technique, hydraulic motors are used for driving the main drive sprocket wheel of the endless track, with interposition of a device for reducing the speed of rotation. The fitting generally adopted is asymmetrical with respect to the plane of symmetry of the main drive sprocket, this necessitating very special machinings costing more than standard machinings.

It is the object of the present invention to overcome this disadvantage by proposing a device for driving an endless track of a machine, such as for example a public works machine, comprising a main drive sprocket provided on its external periphery with a plurality of teeth, which cooperate with a pinion whose outer teeth have a shape corresponding to that of the driving fingers of the endless track, the said main drive sprocket being, on the one hand, mounted for rotation on a support secured to the chassis of the machine, and on the other hand, coupled to a motor which drives it in rotation and is mounted on the said support, via the said pinion, which is wedged on the output shaft of the said motor driving the said main drive sprocket.

The support which is common to the main drive sprocket, to its driving pinion and to the motor has a vertical plane of symmetry which merges with the plane of symmetry common to the main drive sprocket and to its driving pinion.

The following advantageous arrangements are also preferably adopted:

the bearings of the shaft of the main drive sprocket and of the shaft of its driving pinion are constituted by members which are respectively identical and fitted on the support symmetrically with respect to the plane of symmetry of said latter;

the driving pinion shaft comprises, at each one of its ends, areas that are adapted to cooperate with the drive motor and/or with a braking member, such areas being situated symmetrically with respect to the vertical plane of symmetry of the main drive sprocket and of its support.

BRIEF DESCRIPTION OF THE FIGURES

The invention will be more readily understood on reading the following description with reference to the accompanying drawings in which.

DETAILED DESCRIPTION OF A PREFERRED EMBODIMENT

Figure 1:
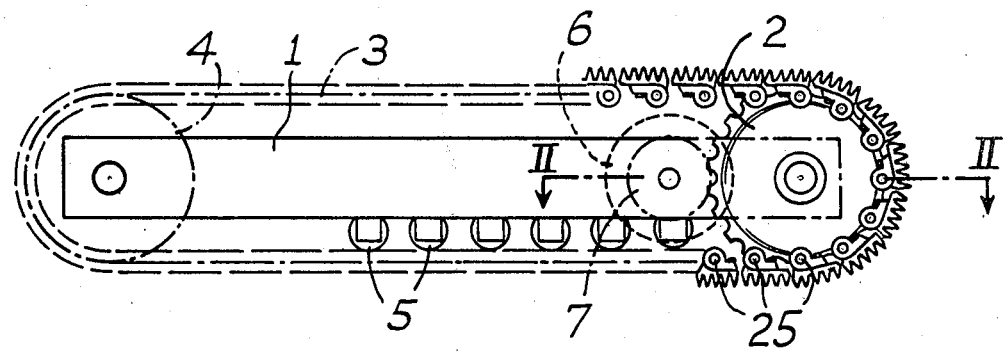
FIG. 1 is a general elevational view of an endless track chassis using a drive device according to the invention.

FIG. 1 shows a chassis adapted to carry a mechanical shovel with endless tracks, comprising a side frame 1, a main drive sprocket or toothed wheel 2 for driving the endless track 3, a tension wheel 4 for the track 3, and support rollers 5 for said track. A hydraulic motor 6 drives a pinion 7 which meshes directly with the main drive sprocket 2.

Figure 2:
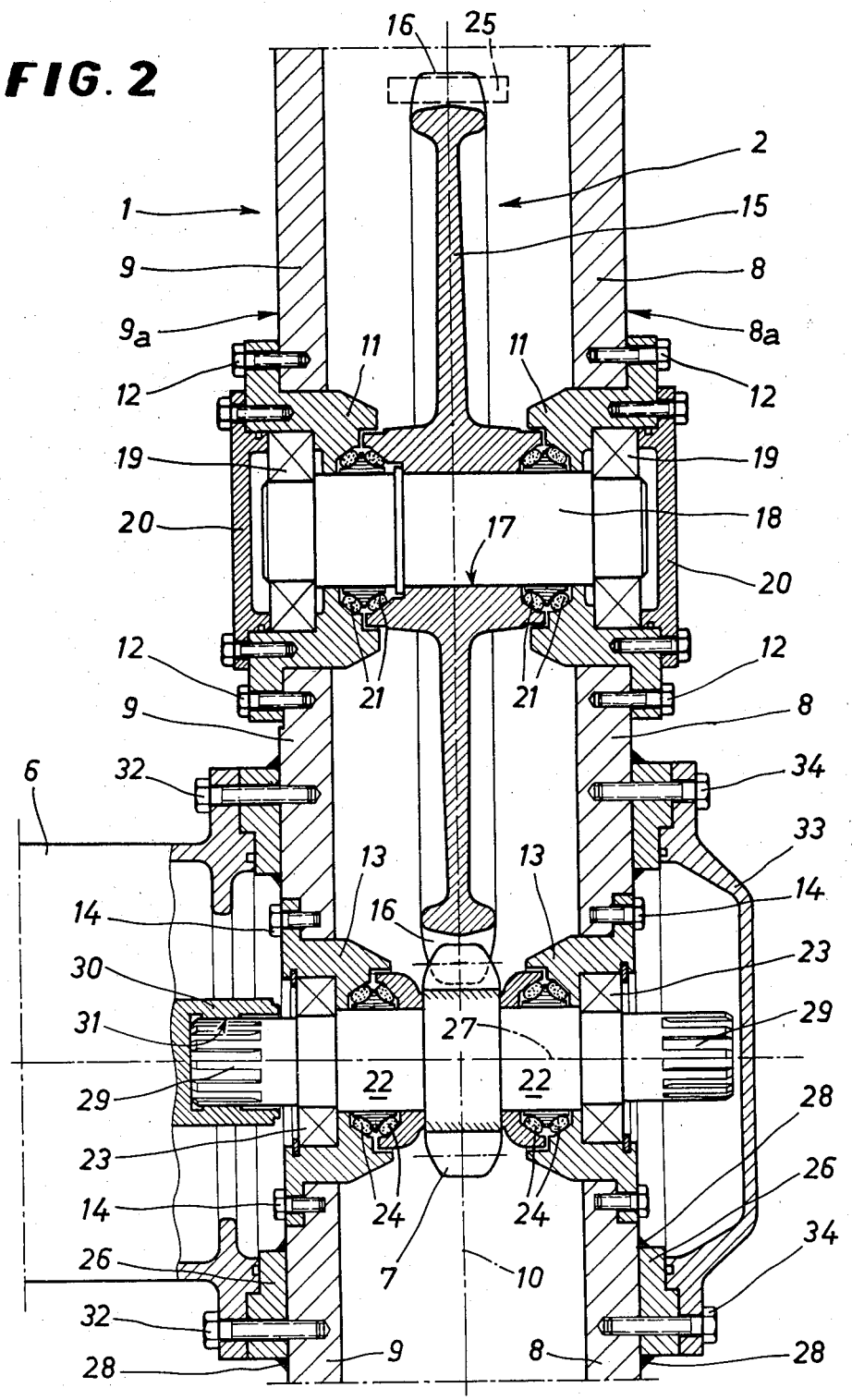
FIG. 2 is a cross-section along II—II of FIG. 1.

The cross-section shown in FIG. 2 illustrates in detail the design of the structure and the assembly. The side frame 1 is made up as a beam comprising two vertical plates 8 and 9 the outer faces 8a and 9a of which are accurately symmetrical with respect to the vertical median plane 10 of the side frame.

Two identical bearing supports 11, are fitted by bolts 12 on the plates 8 and 9 so as to be situated symmetrically with respect to the plane 10. In the same way, two other identical bearing supports 13 are fitted by bolts 14 on the plates 8 and 9, also symmetrically with respect to the plane 10.

The main drive sprocket 2 is composed by a toothed wheel centre supporting teeth 16 and having a central bore 17 force-fitted on an axis 18. The assembly has a plane of symmetry and is supported by ball bearings 19 placed in the bearing supports 11, so as to cause the said plane of symmetry to coincide with the plane 10. Bearing caps 20 hold the ball bearings 19 in position, whilst protecting them, whereas sealing devices 21 are interposed between the axis 18 and the main drive sprocket 2, and between the axis 18 and each bearing support 11.

The pinion 7 is unitary with the axle 22 about which it rotates. The pinion 7 and the axle 22 have a plane of symmetry and are supported by ball bearings 23 placed in the bearing supports 13, so as to cause the said plane of symmetry to coincide with the plane 10. Sealing devices 24 comprising sealing gaskets are interposed between the axle 22 and the pinion 7 proper, on the one hand, and between the axle 22 and each bearing support 13 on the other hand.

A fact to be observed is that the teeth 16 of the main drive sprocket 2 mesh on the one hand, and as already indicated, with the teeth of the pinion 7, and on the other hand with pins 25 driving the elements of the caterpillar track, a pin 25 being coupled to each one of the said link elements of the endless track.

It is also noted that identical circular flanges 26 are welded as indicated at 28 on the faces 8a and 9a of the plates 8 and 9, symmetrically with respect to the plane 10 and coaxially to the geometrical axis of rotation 27 of the pinion 7. It is finally noted that the two ends of the axle 22 are provided with grooves 29.

The arrangement illustrated in FIG. 2 is that in which the output shaft 30 of the motor 6 is also provided with grooves 31 which cooperate with the grooves 29 to make said shaft 30 fast in rotation with the axle 22 of the pinion. The crankcase of the motor 6 is, itself, secured by means of screws 32 on the flange 26 welded to the plate 9. The grooves 29 provided on the other end of the axle 22 are inoperative and protected by a cover 33 secured by bolts 34 on the flange 26 welded on the plate 8.

Figure 3:
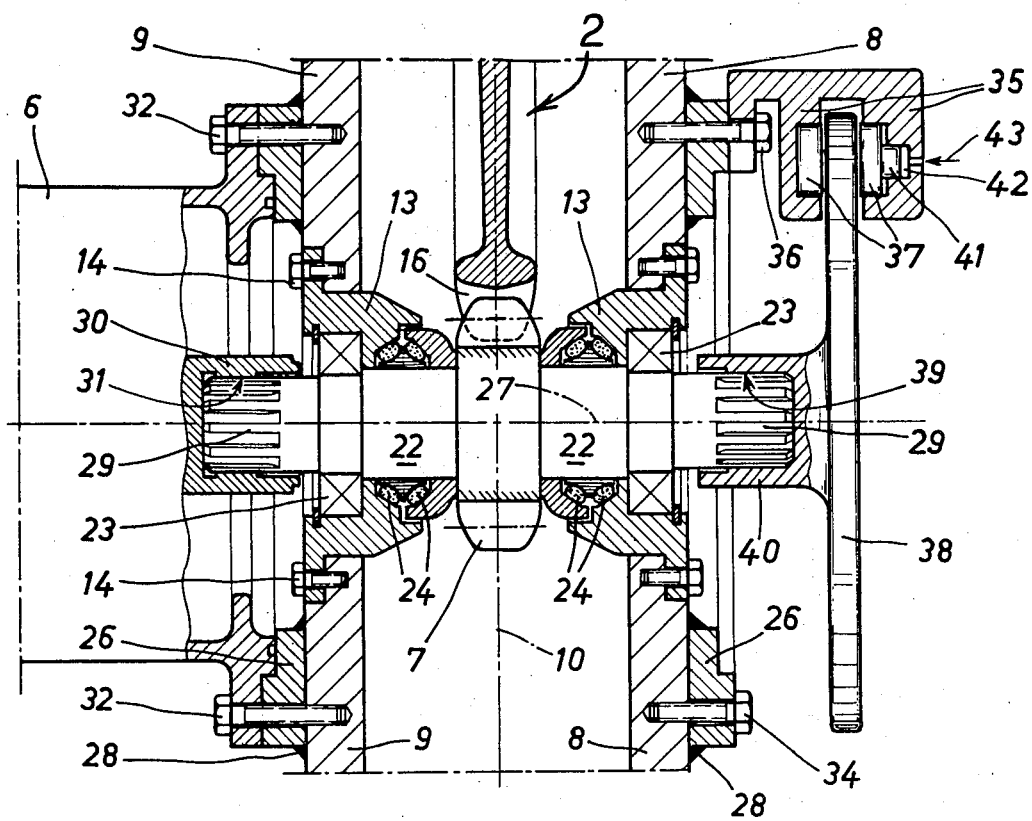
FIG. 3 repeats the embodiment shown in FIG. 2 but completing it by showing a variant embodiment of assembly.

In principle, of course, the grooves 29 provided on the end of the axle 22 opposite the motor 6 are not inoperative. The arrangement illustrated in FIG. 3 which is otherwise identical to that shown in FIG. 2, shows one of the functions which can be assumed by these grooves. A disc brake stirrup piece 35 is secured by means of screws 36 on the flange 26 welded to plate 8. This stirrup piece supports brake pads 37 arranged on either sides of a brake disc 38, the grooves 39 provided in the hub 40 of which cooperate with the said grooves 29 in making the disc 38 fast in rotation with the axle 22. A brake piston 41 moves inside a cylinder 42 provided in the stirrup piece 35, opposite at least one of the pads 37. Said cylinder 42 is furthermore in selective communication with a source of pressurized fluid indicated by arrow 43.

The advantages of the foregoing arrangements are given hereafter.

First to be noted is a complete symmetry of the side frame 1 with respect to the plane 10, and this in the configuration not only where the side frame is constituted by symmetrical plates 8 and 9, but also in the configuration where the side frame is provided with bearing supports 11 and 13. The fitting of the main drive sprocket and of the pinion does not break the said symmetry. Thus it is that the left and right side frames of the chassis supporting a machine on endless tracks are identical, including in their main equipments, this making it possible to adopt the same machining method, and to reduce the costs compared with the conventional separate machinings of the left and right side frames.

From another standpoint, it can also be noted that the main drive sprocket 2 rests, symmetrically, on the bearing supports 11, instead of overhanging as in many prior arrangements, this permitting to adopt supports 11 and ball bearings 19 of reduced dimensions with respect to corresponding elements in said prior arrangements.

The accurate symmetry of the flanges 26 and of their fitting permits one to fit in the motor 6 and the brake disc 38 indifferently on one or the other side of the frame 1. This facilitating greatly the production from the same basic side frame 1 and from a single motor 6, of separate and complete left and right side frames.

In addition, the position of the pinion 7 in the plane of symmetry 10 of the frame 1 contributes to giving a compact and well protected assembly.

Also to be noted is the very easy fitting of the disc brake, due to the availability of a second set of grooves 29, other than those coupled to the output shaft 30 of the engine 6.

The solution described makes it possible to do away with a conventional speed reducer and with the crankcase and oil reservoirs associated thereto. And thus, with a fairly strong and even rustic assembly, one arrives to modern solutions of permanently greased elements and to the elimination of maintenance.

The invention is not limited to the embodiment described but on the contrary covers any variants that could be brought thereto without departing from its scope or from its spirit.

What is claimed is:

1. A drive device for the endless tracks of a machine such as a hydraulic shovel, comprising endless tracks having driving fingers projecting therefrom, an endless track driving sprocket having a plurality of teeth along the external periphery thereof, a pinion having outer teeth cooperating with the plurality of teeth of said driving sprocket and said outer teeth having a shape corresponding to that of said driving fingers of said endless tracks, said driving sprocket being, on the one hand, mounted for rotation on a support secured to the chassis of the machine and being, on the other hand, coupled to a motor which is mounted on the said support and drives the sprocket in rotation by said pinion, said driving motor having an output shaft coupled to said pinion which is fixed against relative rotation with the pinion, and said driving pinion having a shaft having opposite ends, each of its ends having coupling areas adapted to be coupled selectively with said driving motor or with a braking member to cooperate with the drive motor or braking member at the selection of the fabricator.

2. A drive device according to claim 1, wherein said driving sprocket is located in a vertical plane of symmetry of the support structure for said sprocket and said coupling areas at the opposite ends of said shaft of the pinion being situated symmetrically with respect to said vertical plane of symmetry at opposite sides thereof.

* * * * *